C. A. PARSONS.
MEANS FOR HEATING THICK FLANGES OF TURBINES.
APPLICATION FILED APR. 19, 1909.

935,683. Patented Oct. 5, 1909.

ATTEST.

INVENTOR
CHARLES A. PARSONS

UNITED STATES PATENT OFFICE.

CHARLES ALGERNON PARSONS, OF NEWCASTLE-UPON-TYNE, ENGLAND.

MEANS FOR HEATING THICK FLANGES OF TURBINES.

935,683.  Specification of Letters Patent.  Patented Oct. 5, 1909.

Application filed April 19, 1909. Serial No. 490,950.

*To all whom it may concern:*

Be it known that I, CHARLES ALGERNON PARSONS, C. B., a subject of the King of Great Britain and Ireland, and residing at Heaton Works, Newcastle-upon-Tyne, in the county of Northumberland, England, have invented certain new and useful Means for Heating the Thick Flanges of Turbines or other Motors, of which the following is a specification.

This invention relates to the adjustment or control of the heating of motors operated by hot fluids such as steam or gas.

In some cases especially in large engines and turbines, the exigencies of design require that certain metallic portions which are exposed to heat and pressure shall have a much greater thickness or mass of metal at some parts than at others which are in one with them, as for instance, at the corners of the heavy flanges of turbine casings. The uneven heating which takes place in a given time consequent upon these unequal masses produces serious difficulties and where such masses are necessary for the provision of flanges for joints, the distortion or irregular expansion consequent upon the inequality of heating renders it difficult to maintain the joints steam or gas tight.

The object of this invention is to prevent distortion due to heating such irregular masses of metal.

The invention consists in forming cavities in the flanges by means of which the portions of the casing of a motor are secured together, these cavities communicating by means of passages with the interior of the motor and with each other and having an external communication to a pipe in which is placed a steam trap or the like, said pipe either terminating at said steam trap or extending beyond to a regulating valve and from thence to enter a lower pressure part of the motor whereby the hot fluid in said motor is caused to circulate through said cavities.

Figure 1:
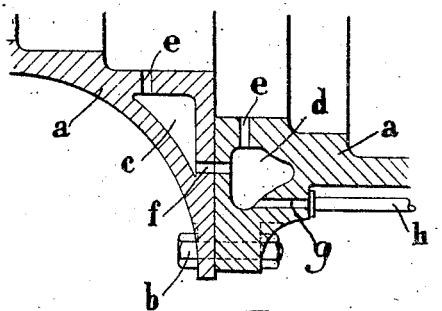
Figure 2:
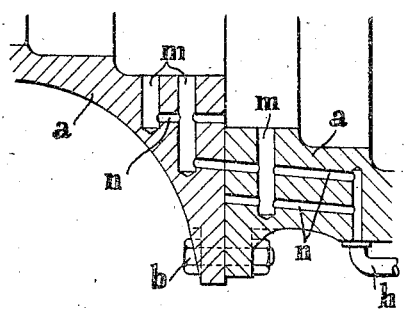
Figure 3:
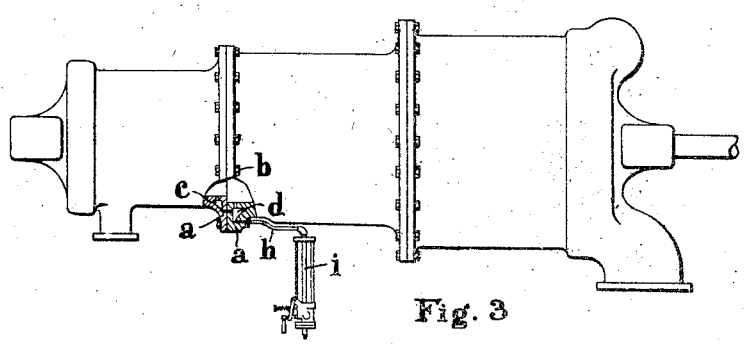
Figure 4:
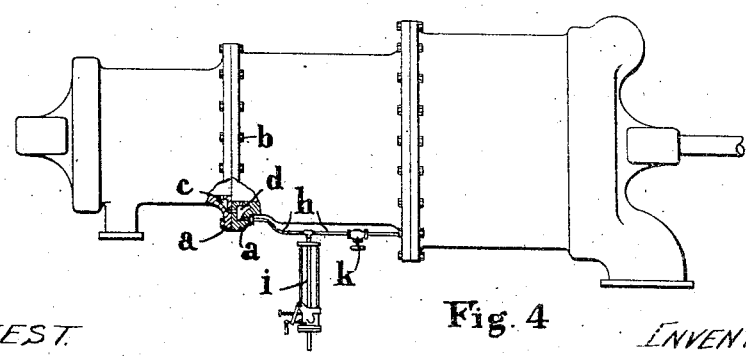

Referring now to the accompanying drawings, which form part of this specification:—Figures 1 and 2 are views showing two ways of allowing the hot fluid to have access to the interior of the masses of metal in the flange of a turbine casing. Fig. 3 is a diagrammatic representation of a turbine in elevation, a piece of one joint being shown in section to illustrate the connection of a steam trap to the cavity in the flanges. Fig. 4 is a similar view to Fig. 3, but showing the hot fluid being conducted back to a lower pressure part of a turbine and a regulating valve being provided to control the circulation of the hot fluid.

In a modification shown in Fig. 1, *a* represents the flanges of two portions of a turbine casing which are secured together by bolts, *b*, so as to produce a steam or gas-tight joint. In these flanges, *a*, are formed cavities, *c* and *d*, communicating with the interior of the turbine by means of the passages, *e*, and with each other by the passage, *f*. At the lowest point of the cavity, *d*, is a hole, *g*, extending to the exterior of the turbine casing and communicating to a pipe, *h*. As shown in Fig. 3 this pipe, *h*, communicates with a steam trap, *i*, or the like. By this means any water that may be formed by the condensation of the steam in the cavities, *c* and *d*, or the pipe, *h*, is got rid of and a circulation of the steam through the cavities is produced by the occasional opening of the steam trap, *i*. If desired however the pipe, *h*, may continue beyond the steam trap, *i*, and enter the turbine again at a lower pressure part and a regulating valve, *k*, may be placed in the pipe, *h*, to control the circulation of steam thus produced. This modification is shown in Fig. 4.

In a further modification shown in Fig. 2, the flanges, *a*, may have holes, *m*, bored therein communicating with the interior of the turbine and also communicate with each other by means of another series of holes, *n*. A pipe, *h*, also communicates with the lowest point of the holes bored in the flanges, *a*; this pipe may be connected up according to either of the arrangements shown in Figs. 3 and 4.

In place of a hand controlled regulating valve, *k*, thermostatic regulating means may be employed if desired.

By this means the difficulties of maintaining a steam or gas tight joint even in very large casings are altogether avoided or materially reduced.

Having now described my invention what I claim as new and desire to secure by Letters Patent is:—

1. A motor operated by hot fluid having in combination a casing, said casing being constructed in a plurality of portions, flanges on said portions by means of which they are secured together, means acting to produce a circulation of the hot fluid through said flanges whereby a tight joint may be maintained between said flanges.

2. A motor operated by hot fluid having in combination a casing, said casing being constructed in a plurality of portions, flanges on said portions by means of which they are secured together, means acting to produce a circulation of the hot fluid through said flanges whereby a tight joint may be maintained between said flanges, and means controlling said circulation.

3. A motor operated by hot fluid having in combination a casing, said casing being constructed in a plurality of portions, flanges on said portions by means of which they are secured together, cavities in said flanges, passages connecting said cavities with the interior of the motor and with each other, a passage extending from one of said cavities to the exterior of the flange, means in communication with said passage acting to produce circulation of the hot fluid through said passages and cavities.

4. A motor operated by hot fluid having in combination a casing, said casing being constructed in a plurality of portions, flanges on said portions by means of which they are secured together, cavities in said flanges, passages connecting said cavities with the interior of the motor and with each other, a passage extending from the lowest point of said cavities to the exterior of the flange, pipe means connecting said passage to a lower pressure portion of the motor whereby a circulation of the hot fluid through the cavities in said flanges is produced.

5. A motor operated by hot fluid having in combination a casing, said casing being constructed in a plurality of portions, flanges on said portions by means of which they are secured together, cavities on said flanges, passages connecting said cavities with the interior of the motor and with each other, a passage extending from one of said cavities to the exterior of the flange, means in communication with said passage acting to produce circulation of the hot fluid through said passages and cavities, and regulating means acting to control said circulation.

6. A motor operated by hot fluid having in combination a casing, said casing being constructed in a plurality of portions, flanges on said portions by means of which they are secured together, cavities in said flanges, passages connecting said cavities with the interior of the motor and with each other, a passage extending from the lowest point of said cavities to the exterior of the flange, pipe means connecting said passage to a lower pressure portion of the motor whereby a circulation of the hot fluid through the cavities in said flanges is produced, and regulating means in said pipe means serving to control said circulation.

7. A motor operated by hot fluid having in combination a casing, said casing being constructed in a plurality of portions, flanges in said portions by means of which they are secured together, cavities in said flanges, passages connecting said cavities with the interior of the motor and with each other, a passage communicating with the lowest point of said cavities and leading to the exterior of the flange, a pipe in connection with said passage, and a steam trap connected to said pipe.

8. A motor operated by hot fluid, having in combination a casing, said casing being constructed in a plurality of portions, flanges on said portions by means of which they are secured together, cavities in said flanges, passages connecting said cavities with the interior of the motor and with each other, a passage communicating with the lowest point of said cavities and leading to the exterior of the flange, a pipe in connection with said passage, and a steam trap connected to said pipe, said pipe communicating with the interior of the motor at a lower pressure part and a regulating valve in said pipe between said steam trap and the point where the pipe reënters the turbine.

In testimony whereof, I affix my signature in presence of two witnesses.

CHARLES ALGERNON PARSONS.

Witnesses:
FREDERICK GORDON HAY BEDFORD,
WILLIAM SHEARER.